United States Patent [19]
Law

[11] Patent Number: 6,039,513
[45] Date of Patent: Mar. 21, 2000

[54] SEPARATOR FOR AIR CONVEYED PELLETS

[76] Inventor: R. Thomas Law, 448 S. First, #300, Hillsboro, Oreg. 97123

[21] Appl. No.: 08/929,046

[22] Filed: Sep. 15, 1997

[51] Int. Cl.⁷ .................................................. B65G 53/60
[52] U.S. Cl. ........................ 406/171; 406/172; 406/163; 406/157
[58] Field of Search ................................... 406/157, 163, 406/171, 172

[56] References Cited

U.S. PATENT DOCUMENTS

| | | | |
|---|---|---|---|
| 891,191 | 6/1908 | Shinn et al. | 406/171 X |
| 2,812,217 | 11/1957 | Koch et al. | 406/171 |
| 3,580,644 | 5/1971 | Ballard, Jr. | 406/30 |
| 3,612,616 | 10/1971 | Stewart | 406/172 |
| 3,829,165 | 8/1974 | Boon | 406/171 |
| 4,900,345 | 2/1990 | le Jeune | 55/337 |
| 5,378,089 | 1/1995 | Law | 406/123 |

Primary Examiner—Christopher P. Ellis
Assistant Examiner—Jeffrey A. Shapiro
Attorney, Agent, or Firm—James D. Givnan, Jr.

[57] ABSTRACT

A separator for removing pellets from an air flow has a screen inclined to the path of the pellets and which deflects the pellets toward a pellet discharge member for subsequent delivery to a hot melt glue tank. The screen is detachably carried by an air outlet of the separator which, in turn, is detachably mounted on the separator. In a modified air outlet, stacked screens of decreasing aperture cross section are removably secured in place by a bayonet lock on the screens and air outlet.

1 Claim, 1 Drawing Sheet

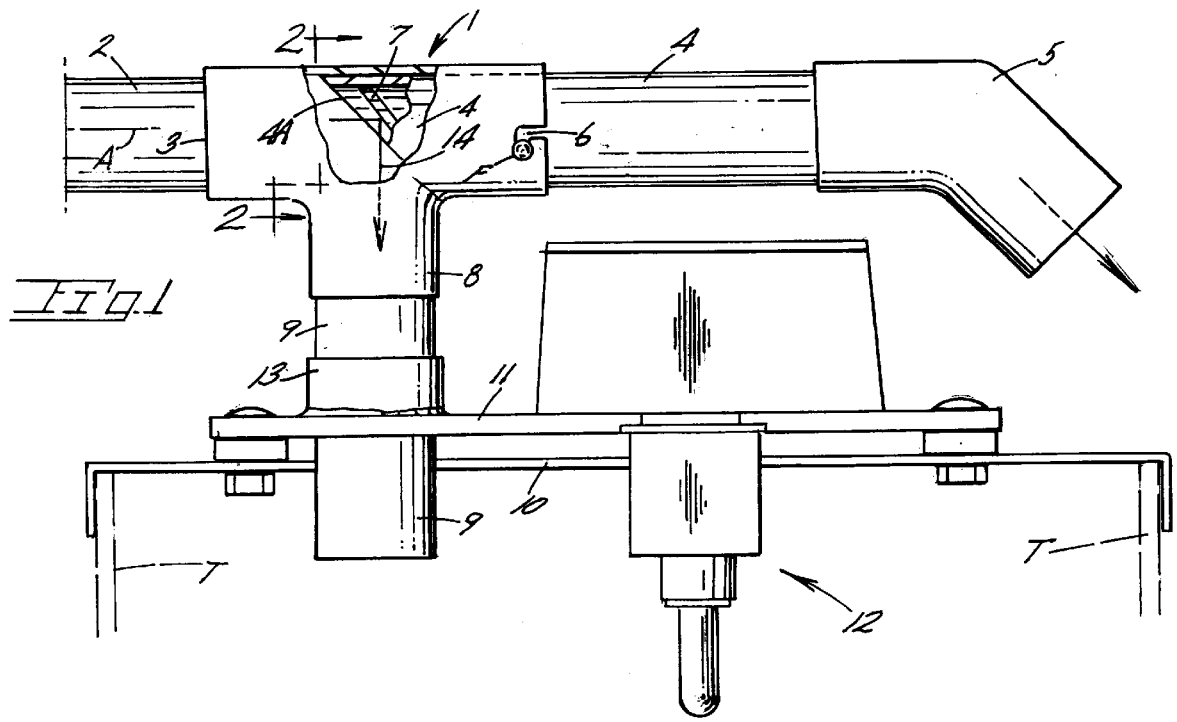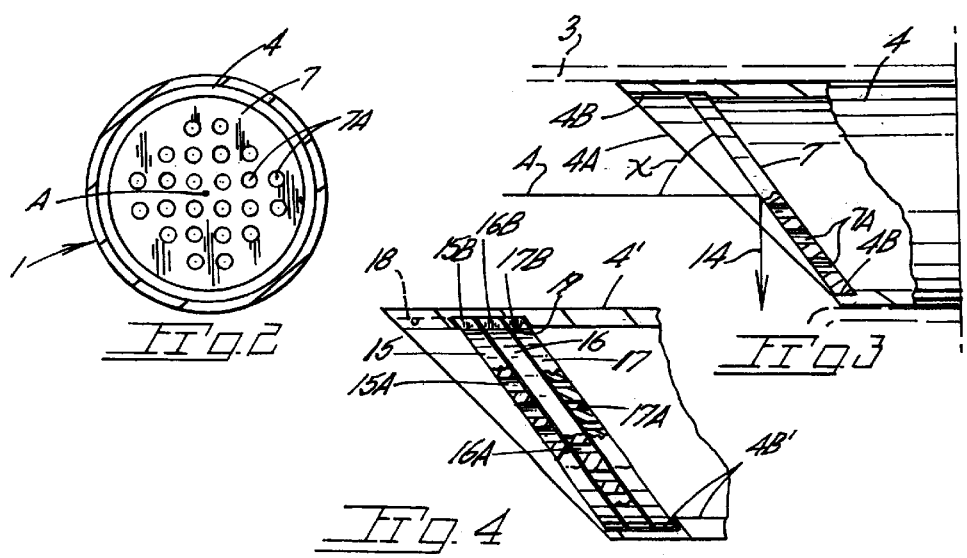

SEPARATOR FOR AIR CONVEYED PELLETS

BACKGROUND OF THE INVENTION

The present invention pertains generally to a separator for diverting particulate matter from an air flow while venting the air flow away from the collected matter.

In wide use presently are hot glue melt tanks used in various industrial applications where large quantities of glue are utilized. Commonly pellets of glue are stored at a site remote from a glue melt tank for subsequent transfer to the tank via a conduit air flow inter-mittently charging the tank with pellets. The viscous glue produced by the melted pellets is drawn off of the tank for application to a variety of articles, usually containers. Hot melt glue tanks have heretofore been vented to permit escape of the pressurized air flow utilized for pellet delivery. The air flow entering the tank is of such force as to splatter melted glue about the tank interior of times resulting in a tank vent becoming clogged, or at least impaired to the extent a back pressure results in the pellet delivery conduit to impede the conveyance of pellets from storage site to tank. Cleaning of tank vents to remove hardened splattered glue is an arduous, time consuming task, which of course interrupts tank operation. Additionally, the infusion of an air flow into a hot melt glue tank diminishes tank efficiency requiring a greater expenditure of energy to keep same at the requisite elevated temperature.

U.S. Pat. No. 5,378,089 discloses an apparatus utilizing transfer conduits delivering glue pellets with a pressurized air flow for discharge into hot melt glue tanks.

U.S. Pat. No. 2,812,217 discloses a separation device for removal of fibrous tobacco from an air flow by means of a screen interposed in parallel and between inlet and outlet conduits.

U.S. Pat. No. 3,580,644 discloses a separator wherein a screen is disposed in a shallow angular relationship with inlet and outlet conduits for removal of shredded tobacco from an air flow.

U.S. Pat. No. 3,612,616 discloses a separator wherein a filter is diagonally disposed relative coaxial inlet and outlet conduits with provision made for reversing an air flow through the filter for removal of fibrous waste therefrom.

U.S. Pat. No. 3,829,165 discloses a pneumatic conveyer system with provision made for diverting partial air flow through a bypass element, located upstream from a separator, to reduce operating vacuum or pressure of the system, particularly when an inclined screen thereof is clogged.

U.S. Pat. No. 4,900,345 discloses a separator utilizing a cylindrical grid serving to remove material from an air flow for discharge downwardly through a collector. A positionable flap at the throat of the separator alters the flow of air and particles about the cylindrical grid.

SUMMARY OF THE PRESENT INVENTION

The present invention pertains to a separator utilized in a pneumatic conveyor system to direct pellets from a conveying air flow toward a discharge outlet while diverting a major portion of the air flow away from a pellet receptacle.

Interiorly of a conduit of the present separator is a deflector against which air borne particles impinge with their course being forceably altered toward a tank receptacle while the major portion of the air flow is vented. The vent component of the separator may be removably coupled to the separator conduit to facilitate access to the pellet deflector therein. The deflector is shown as a disk with a multitude of apertures and disposed so as to deflect pellets or other particulate material directly into a discharge outlet in communication with a glue tank interior. Accordingly, tank delivery of the pellets is achieved in a rapid manner while avoiding an excessive flow of pressurized air to the tank.

Important objectives include the utilization of a separator in a pneumatic conveyor system which serves to vent conveying air to the atmosphere while forcefully deflecting the conveyed articles toward a receptacle, in the present disclosure, a hot melt glue tank; the provision of a separator serving to vent a particle conveying air flow to the atmosphere while restricting entry of only a minor portion of the air flow into a hot melt glue tank to greatly increase thermal efficiency of the tank; and the provision of a separator which vents a pellet conveying air flow to the atmosphere to lessen entry of conveying air into a hot melt glue tank to avoid splattering of melted glue about the tank interior to minimize clogging of a tank vent.

BRIEF DESCRIPTION OF THE DRAWINGS

In the accompanying drawings:

FIG. 1 is an elevational view of the present separator in place on a lid assembly of a hot melt glue tank, the latter shown in phantom lines;

FIG. 2 is a vertical sectional view taken along line 2—2 of FIG. 1;

FIG. 3 is an enlarged fragment of an air outlet of the present separator; and

FIG. 4 is a view similar to FIG. 3 showing a modified air outlet.

DETAILED DESCRIPTION OF THE PREFERRED EMBODIMENTS

With continuing attention to the drawings, in which applied reference numerals indicate parts similarly hereinafter identified, the reference numeral 1 indicates generally a conduit of the present separator.

The present separator is served by a pneumatic transfer conduit 2 in communication at its unseen end with a source of glue pellets, as for example a container for a large quantity of such pellets, in which the upstream or unseen end of the conduit is inserted for the pick up of the pellets by a vacuum transducer of the type shown in U.S. Pat. No. 5,378,089 issued to the present inventor and incorporated herein by reference. Such a vacuum transducer is served by a pressurized air flow to induce intake of the pellets from within the container and the transport of same by pressurized air flow through transfer conduit 2.

An inlet 3 of the present separator receives the airborne pellets from transfer conduit 2 while an air outlet or vent is at 4 preferably provided with an elbow 5. Attachment of air outlet 4 to conduit 1 is shown in a detachable manner, as by for example, a bayonet lock 6 utilizing a headed fastener F on air outlet 4. An innermost end 4A of air outlet 4 is accordingly held seated within conduit 1 and is downwardly and rear-wardly inclined with respect to an axis A of the combined pellet and pressurized air flow.

Occupying end 4A of air outlet 4 is a disk shaped screen 7 of rigid construction and may be embodied in a perforate brass plate as shown in FIGS. 2 and 3, and defining a multitude of axially disposed apertures 7A through which pellet transferring air flow passes into air outlet 4.

Screen 7 is inclined to axis A to direct impinging pellets into a pellet discharge 8 of the separator. Discharge 8 is in downstream communication with a tubular conduit 9, the distal end of which is located within a hot melt glue tank T.

A superstructure 11 on a cover 10 serves to carry a probe generally at 12 for contact with the melted glue and which is in electrical circuit with an automatic loading system which regulates the delivery of pellets into transfer conduit 2. The operaton of probe assembly 12 is disclosed in the aforementioned patent incorporated herein by reference as above noted. With attention again to the present separator, tubular support means includes a collar 13 which supports tubular outlet 9 through which pellets are directed from the separator into hot glue tank T. Airborne pellets, moving along transfer conduit 2 and axis A, forcefully strike or impact screen 7 and are diverted downwardly along a path indicated approximately by arrow 14 for unhindered entry into pellet discharge 8 and ultimately discharge into glue tank T closed by cover 10. Screen 7 may define an included angle X with axis A ranging from 30° to 60°.

Removal of screen 7 is readily accomplished upon detachment of air outlet 4 permitting access to the inlet end 4A thereof and the screen. Screen retention within the inlet end of air outlet 4 may be by a friction fit of the screen periphery with a shouldered inner wall segment 4B of the inlet end of the air outlet.

In FIG. 4 a modified air outlet at 4' receives multiple disk-shaped supplemental screens at 15, 16, and 17 with the openings therein as at 15A, 16A, and 17A being of decreasing cross section with the openings 16A–17A serving to block the passage of glue pellet fragments that may occur upon pellet fracture when contacting screen 15. The stack of screens is removably mounted in air outlet 4' as by a bayonet lock with screen ears 15B, 16B and 17B insertable along an axial groove 18 terminating in an offset open area 19 in the inner wall surface 4B' of the air outlet.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A separator for removing pellets from an air flow transporting the pellets from a stored area to a hot melt glue tank and venting the air flow, said separator including:

a conduit having an inlet in which the air flow and the pellets borne thereby are received, a pellet discharge outlet in communication with the tank, and an air outlet for venting the air flow, tubular support means carried by the tank and in communication with said pellet discharge outlet and through which pellets may be discharged into the hot melt glue tank, a screen in said conduit and supported thereby in inclined relationship to said inlet to divert the airborne pellets impacting the screen toward said pellet discharge outlet for deposit into the glue tank, and supplemental screens having openings therein of a cross-sectional size different from the like openings in said screen, and locking means confining said screen and said supplemental screens in said conduit.

* * * * *